Figure 4:
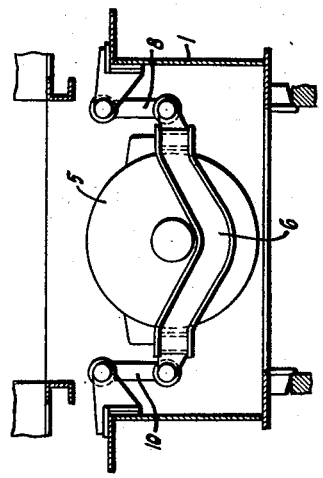

March 8, 1955
P. HIRT
2,703,535
MOUNTING OF DRIVING MOTORS IN
THE BOGIES OF RAIL VEHICLES
Filed Sept. 19, 1949
9 Sheets-Sheet 1
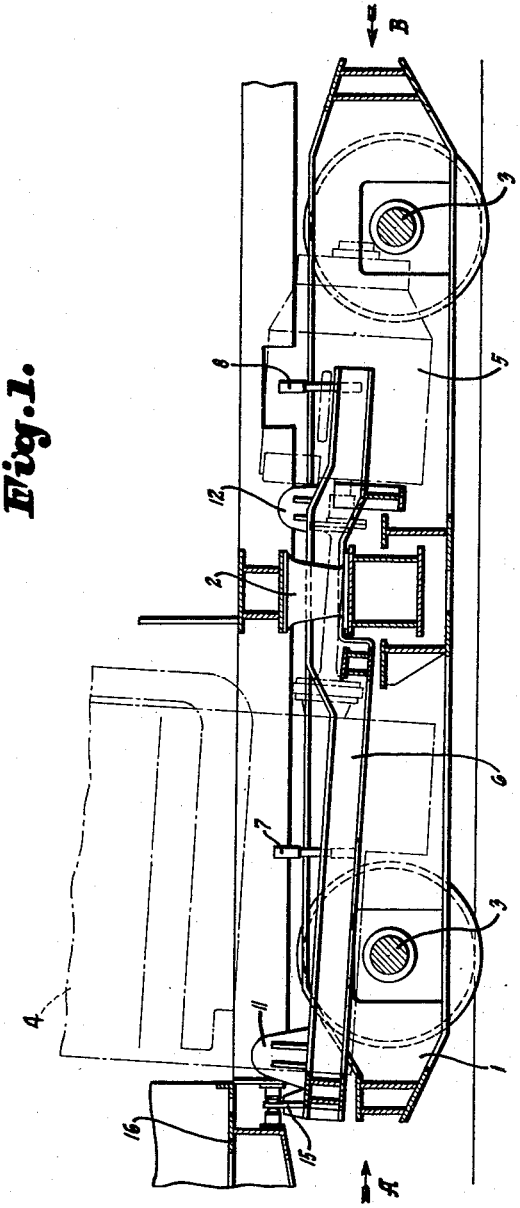
INVENTOR
PETER HIRT
BY
*Marechal & Biebel*
ATTORNEYS March 8, 1955

P. HIRT 2,703,535

MOUNTING OF DRIVING MOTORS IN
THE BOGIES OF RAIL VEHICLES

Filed Sept. 19, 1949

9 Sheets-Sheet 3

INVENTOR
PETER HIRT
BY
Marechal & Biebel
ATTORNEYS

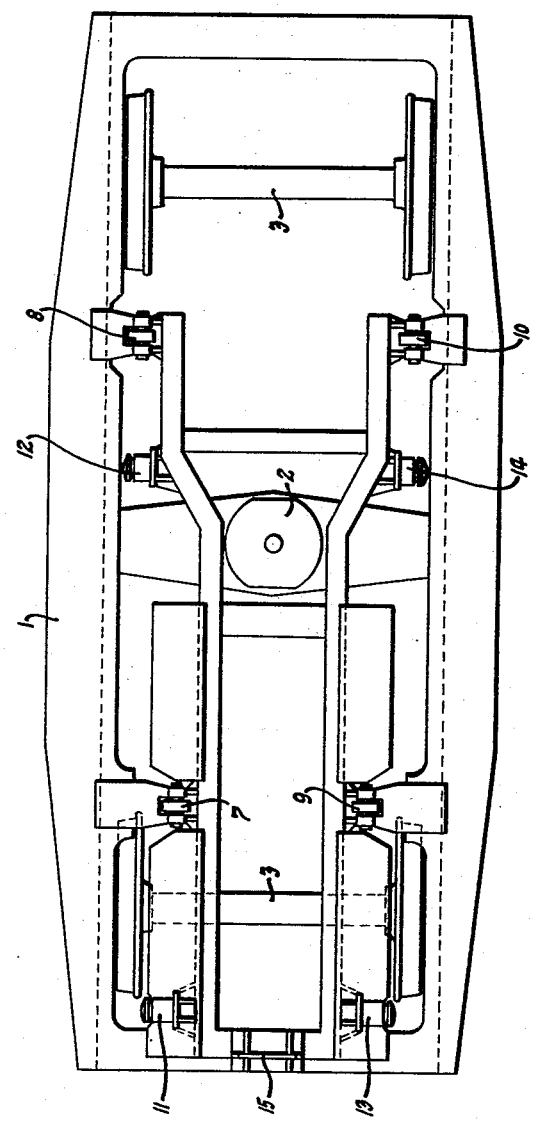

March 8, 1955
P. HIRT
2,703,535
MOUNTING OF DRIVING MOTORS IN
THE BOGIES OF RAIL VEHICLES
Filed Sept. 19, 1949
9 Sheets-Sheet 4
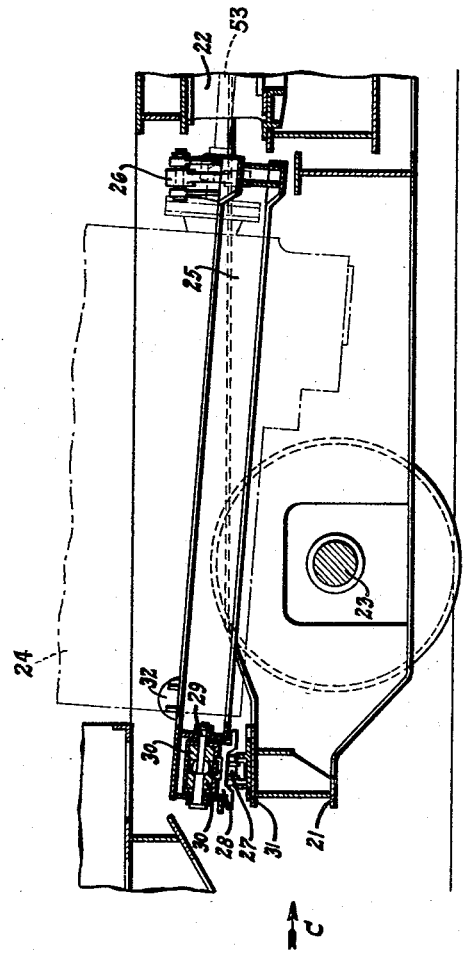
INVENTOR
PETER HIRT
BY
Marechal & Biebel
ATTORNEYS

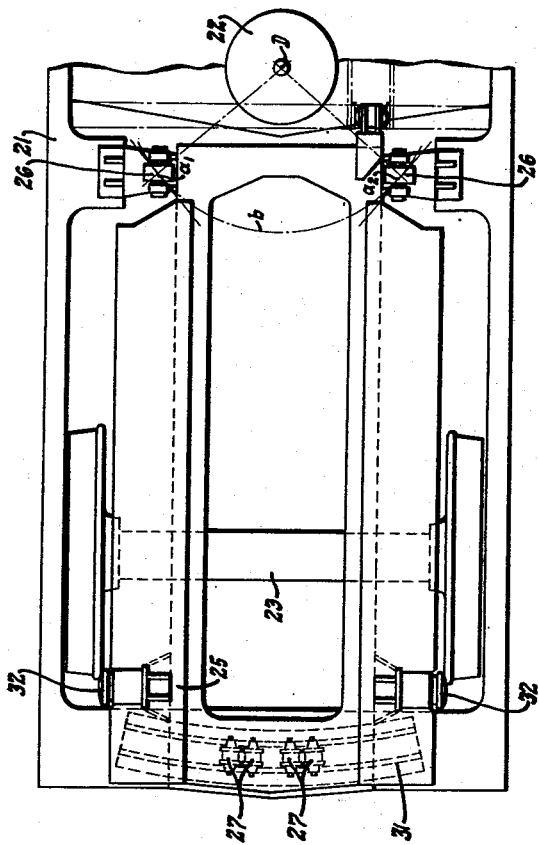

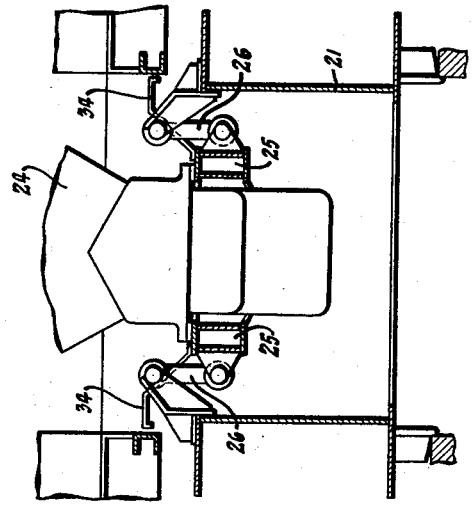
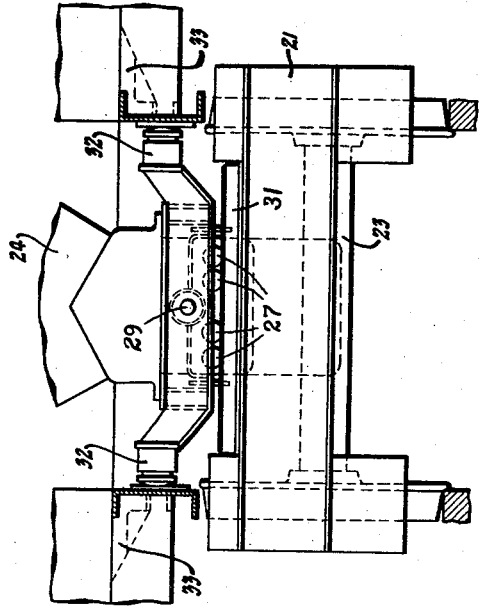

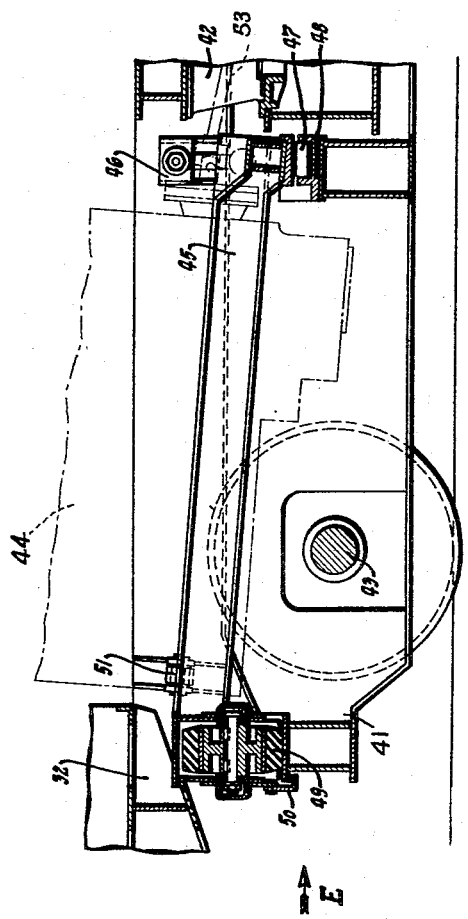

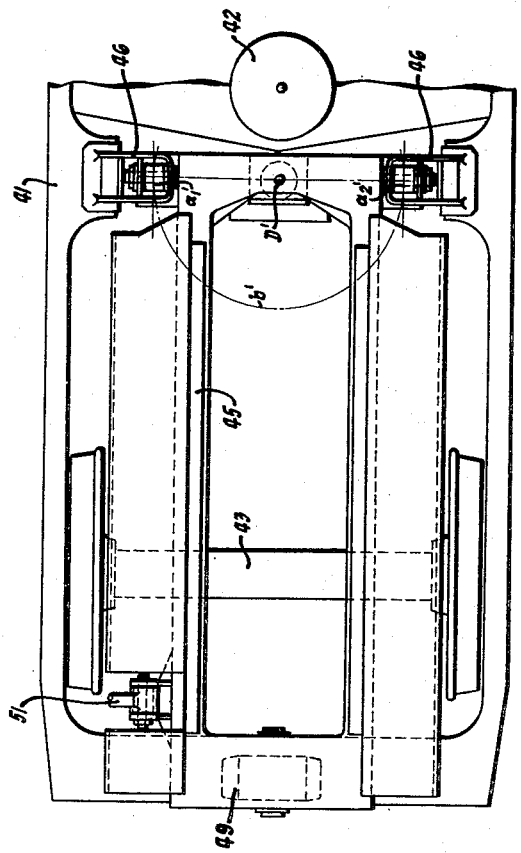

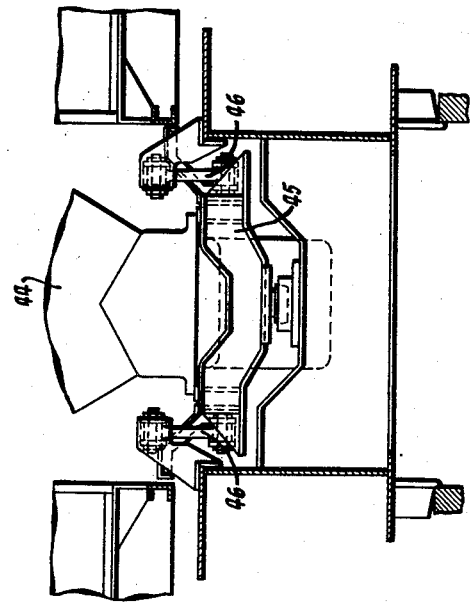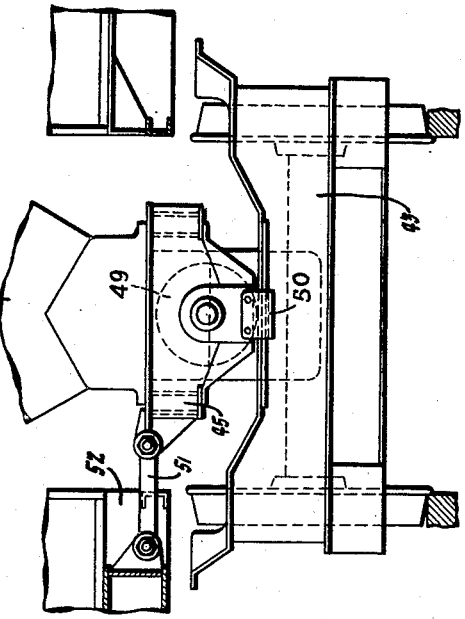

United States Patent Office 2,703,535
Patented Mar. 8, 1955

2,703,535

MOUNTING OF DRIVING MOTORS IN THE BOGIES OF RAIL VEHICLES

Peter Hirt, Augsburg, Germany, assignor to Maschinenfabrik Augsburg-Nurnberg A. G., Augsburg, Germany, a corporation of the German Republic Application September 19, 1949, Serial No. 116,583

Claims priority, application Germany March 23, 1949

18 Claims. (Cl. 105—133)

This invention relates to certain improvements in the mounting of driving aggregates, more particularly internal combustion engines, in the trucks or bogies of rail vehicles.

It is an object of the present invention to provide a design of the type referred to, in which the penetration of dirt and dust into the interior of the carriage body or superstructure is efficaciously avoided.

Another object of the invention is to provide a design which permits the accommodation of motors or engines which so far, owing to the lateral motion of the motor in relation to the carriage body, could not be accommodated, e. g., in rail motor cars of narrow gauge railways.

Still another object of the invention is to provide a mounting of the type referred to in which the conventional provision of flexible packing materials in the form of leather bellows and the like between the relatively movable parts, in order to prevent the penetration of dust or dirt into the carriage body, can be avoided.

Still another object of the invention is to provide a mounting which permits the easy interchange of the motor aggregate.

According to the present invention, the driving aggregate or power plant for propelling the vehicle is arranged on a special frame or chassis which is mounted in the truck or bogie frame in such a way that the driving aggregate is guided in the carriage body and does not partake in the lateral motions of the truck. To this end, the supporting points of the driving aggregate are permitted to swivel on circular arcs about the pivot of the truck or tangentially to said arcs or, according to a modification, the pivot of the swivelling motion of the motor frame in relation to the truck frame is placed on, or in the vicinity of, the connecting line between the two suspension points which are arranged at the end of the motor frame facing the center pin of the truck.

This mounting of the driving aggregate in the truck frame permits lateral swivelling of the truck, e. g., in curves, while the driving aggregate does not change its position in relation to the carriage body. Hence, the cut out in the bottom of the carriage body can be better adapted to the part of the engine projecting into the carriage body, so that large gaps which would foster the penetration of dust and dirt into the engine frame, are no longer required.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 3:
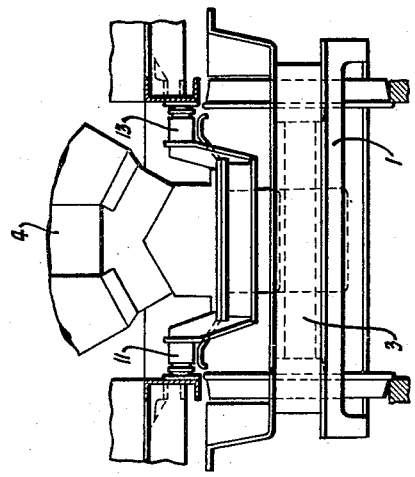

In the drawing:

Fig. 1 is a longitudinal section through the truck, with the pivot of the motor frame in the swivelling axis of the truck, Fig. 2 is a plan view of the truck as per Fig. 1, Fig. 3 is an end view, in the direction of arrow A in Fig. 1, Fig. 4 is an end view in the direction of arrow B in Fig. 1, Fig. 5 is a side view of a truck and a section through the roller support of the motor frame, Fig. 6 is a plan view on a motor and truck frame as per Fig. 5, Fig. 7 is a view in the direction of arrow C in Fig. 5, Fig. 8 is a view of the pendulum suspension system seen from the center pin of the truck, Fig. 9 is a longitudinal section through one half of a truck including the motor frame, the fulcrum D' being arranged outside of the axis of the truck, Fig. 10 is a plan view on the motor and the truck frame according to Fig. 9, Fig. 11 is a view in the direction of arrow E in Fig. 9, and Fig. 12 is an elevation of the pendulum suspension system as per Fig. 9, viewed from the truck pivot.

Similar reference numerals denote similar parts in the different views.

In Figs. 1 to 4, 1 is the truck frame, 2 is the center pin of the truck and 3 are the axles of the truck. The internal combustion engine 4 and the electric generator 5 are fixedly connected with the motor frame 6 which in turn is suspended, by means of the ball joint pendulum systems 7, 8, 9, 10, in the truck frame in such a manner that the suspension points are allowed to swing on circular arcs about the center axis of the center pin 2 of the truck. The motor frame is laterally guided in the carriage body 16 by means of stoppers 11, 12, 13, 14, while the stopper 15 at the end face of the motor frame serves to guide the same in both directions of the middle axis. The transmission of the driving energy from the engine-generator aggregate to the electric motor (not shown) forming part of the swivelling truck, i. e. in most instances of another truck than that carrying the engine-generator aggregate, is effected by means of a flexible electric cable (not shown) in the manner known from electrically driven railway cars.

If, for instance, merely the driving internal combustion engine 4 is arranged in the engine frame, the suspension pendulum system may be arranged on one side of the truck center pin 2, and if desired a three-point suspension may be provided instead of the four-point suspension. In this case the third suspension point would advantageously be arranged at the end face of the motor frame.

Referring now to Figs. 5 to 8, the truck frame in this case is designated 21, the center pin of the truck is shown at 22 and one of the truck axles at 23. The internal combustion engine 24 is fixedly connected with the motor frame 25 which is supported in the truck frame 21. At its side facing the center pin 22 the engine frame 25 is suspended from the truck frame 21 at two points by means of ball joint pendulum systems 26 in such a manner that the suspension points at the motor frame 25 are permitted to swing about the fulcrum D on tangents $a_1$, $a_2$ of the circular arc $b$ (see Fig. 6).

On the side of the engine frame 25 facing away from the center pin 22 the frame is supported with the aid of rollers 27 which are mounted in a slide or carriage 28. The motor frame 25 is connected to the slide 28 through a pin 29 having a central globular portion. Elastic elements 30, such as resilient rubber bushings or springs around pin 29 are provided to absorb vertical shocks transmitted from the truck frame 21 to the motor frame 25 through rollers 27, thereby eliminating within the limits of normal operation the tendency for that end of frame 25 to lift or bounce off frame 21 as a result of such vertical shocks as occur in operation. The rollers 27 have flanged rings by which horizontal thrust forces occurring in case of deceleration (braking) and acceleration (starting) of the vehicle are transmitted to the bow-shaped or arched runway 31 which is fixedly connected to the truck frame. The motor frame 25 is guided in the carriage body 33 by means of the guide members 32. The free space between the motor frame 25 and the carriage body 33 is bridged by shield members 34 by which the motor is completely covered from below, since a relative motion between the motor frame and the carriage body in case of the passing of curves does not take place. In this embodiment of the invention the driving energy is mechanically transmitted from the engine 24 to the gear (not shown) which forms part of the swivelling truck, by means of a Cardan shaft 53.

In Figs. 9 to 12, 41 denotes the truck frame, 42 the center pin of the truck, and 43 one truck axle. The internal combustion engine 44 is fixedly connected with the motor frame 45 which is mounted in the truck frame 41. At the side facing the center pin 42 the motor frame 45 is suspended at two points, by means of pendulums 46, on the truck frame 41 in such a manner that the suspension points at the motor frame 45 are permitted to swing on tangents $a_1'$, $a_2'$ to the circular arc $b'$ about the center $D'$ (see Fig. 10). This center $D'$ is situated on the connecting line between the two pendulum bearings 46. Thus it is possible to do with simple plane pendulum bearings 46, since the rubber blocks (not shown) built into the pendulum bearing can easily take up the small deviations from the plane pendulum movement. The fulcrum $D'$ is designed as a pin 47 which is secured to the motor frame 45 and seated in a center plate 48 at the truck frame 41. Through the center pin 47 the horizontal thrust forces occurring primarily on acceleration and braking, are also transmitted from the motor frame 45 to the truck frame 41. In order to support the motor frame at the end face of the truck frame, a roller 49 is provided, which rolls off on a suitable runway of the truck frame 41 in case of relative movements of the motor frame 45 with respect to the truck frame 41. The screwed-on stop 50 prevents lifting off of the roller 49 from the runway of the truck frame by heavy vertical shocks. The motor frame 45 is guided by the link rod 51 which connects the motor frame 45 with the carriage body 52. The torque of the engine is again transmitted to the gear (not shown) by a Cardan shaft 53.

Instead of a support by means of pendulum bearings or elastic rollers it is also possible, in case of the provision of a separate center pin 47 for the motor frame, to provide a support in the form of simple guideways.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a railway car, in combination, a carriage body, a truck frame, a center pin for said truck frame, a separate motor frame, means for movably supporting said motor frame on said truck frame at a plurality of points providing for swinging movement of said points of support tangentially to circular arcs about said center pin, and means for guiding said motor frame by said carriage body providing horizontal swinging movement of said motor frame with said body relative to said truck frame.

2. In an automotive rail vehicle, in combination, a carriage body, a truck frame, a chassis separate from said body for receiving and supporting a power plant thereon, a swivel connection for guiding and supporting said carriage body directly on said truck frame for swiveling movement therebetween, said carriage body having a recess for receiving a part of said power plant therein, means separate from said body for supporting said chassis upon said truck frame for swinging movement relative thereto upon swiveling movement of said body relative to said truck frame, said separate means including a plurality of suspension members movably connecting one end of said chassis with said truck frame and means movably supporting the other end of said chassis for horizontal arcuate displacement of said power plant within said truck frame, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

3. In an automotive rail vehicle, in combination, a carriage body, a truck frame, a chassis separate from said body for receiving and supporting a power plant thereon, a swivel connection for guiding and supporting said carriage body directly on said truck frame for swiveling movement therebetween, said carriage body having a recess for receiving a part of said power plant therein, separate means within said truck frame for supporting said chassis for swinging movement relative thereto upon swiveling movement of said body relative to said truck frame, said separate means including suspension members for one end of said chassis pivotally connected with said truck frame and roller means for supporting the opposite end of said chassis on said truck frame, said suspension members and said roller means cooperating for arcuate displacement of said chassis within said truck frame, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

4. In an automotive rail vehicle, in combination, a carriage body, a truck frame, a chassis separate from said body for receiving and supporting a power plant thereon, a swivel connection for guiding and supporting said carriage body directly on said truck frame for swiveling movement therebetween, said carriage body having a recess for receiving a part of said power plant therein, separate means within said truck frame for supporting said chassis for swinging movement relative thereto upon swiveling movement of said body relative to said truck frame, said separate means including two swinging pendulum members movably connecting one end of said chassis with said truck frame, roller means for supporting the other end of said chassis on said truck frame, and pivot means between said chassis and said truck frame for absorbing horizontal thrusts of said chassis longitudinally of said truck frame, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

5. For automotive rail vehicles a replaceable power truck unit for mounting beneath the body of said vehicle for swiveling movement thereunder and having suspended in said truck unit a power plant for propelling said vehicle protruding substantially above said unit into said body, comprising a truck frame, a chassis separate from said body and said truck frame for receiving and supporting said power plant thereon for limited horizontal swinging motion of said power plant and chassis relative to said truck frame, separate means within said truck frame for supporting said chassis for swinging movement relative thereto upon swiveling movement of said body relative to said truck unit, said separate means including suspension members pivotally connected between one end of said chassis and said truck frame at a plurality of points and means for movably supporting the other end of said chassis on said truck frame for said swinging movement of said chassis relative to said truck frame, and guide means on said chassis for co-operation with said body for effectuating the swinging of said chassis upon said truck frame to retain said power plant and said chassis in predetermined substantially uniform relation with respect to said body throughout the swiveling action of said body relative to said truck frame.

6. In an automotive rail vehicle, in combination, a truck frame, a carriage body swivelly mounted on said truck frame, a chassis separate from said body for receiving and supporting a power plant thereon, means separate from said body for supporting said chassis directly upon said truck frame for swinging movement relative thereto upon swiveling movement of said body relative to said truck frame, said separate means including suspension members for one end of said chassis pivotally connected with said truck frame and roller means for supporting the opposite end of said chassis on said truck frame, said suspension members and said roller means cooperating for arcuate displacement of said chassis within said truck frame, additional means movably interconnecting said chassis and said truck frame for preventing substantial horizontal relative movement therebetween longitudinally of said truck frame, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

7. In an automotive rail vehicle, in combination, a truck frame, a carriage body swivelly mounted on said truck frame, a chassis separate from said body for receiving and supporting a power plant thereon, means separate from said body for supporting said chassis directly upon said truck frame for swinging movement relative thereto upon swiveling movement of said body relative to said truck frame, said separate means including swinging pendulum members movably connecting one end of said chassis with said truck frame and roller means for supporting the opposite end of said chassis on said truck frame, said suspension members and said roller means cooperating for arcuate displacement of said chassis within said truck frame, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

8. In an automotive rail vehicle, in combination, a truck frame, a carriage body swivelly mounted on said truck frame, a chassis separate from said body for receiving and supporting a power plant thereon, means separate from said body for supporting said chassis directly upon said truck frame for swinging movement relative thereto upon swiveling movement of said body relative to said truck frame, said separate means including two swinging pendulum members movably connecting one end of said chassis with said truck frame, means for movably supporting the other end of said chassis on said truck frame, and pivot means between said chassis and said truck frame for absorbing horizontal thrusts of said chassis longitudinally of said truck frame, said pivot means being substantially aligned with said two pendulum members whereby said pendulum members swing tangentially to circular arcs about said pivot means, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

9. In an automotive rail vehicle, in combination, a carriage body, a truck frame, a chassis separate from said body for receiving and supporting a power plant thereon, a swivel connection for guiding and supporting said carriage body directly on said truck frame for swiveling movement therebetween, separate means within said truck frame for supporting said chassis for swinging movement relative to said truck frame, said separate means including suspension members for one end of said chassis pivotally connected with said truck frame and roller means for supporting the opposite end of said chassis on said truck frame, said suspension members and said roller means cooperating for arcuate displacement of said chassis within said truck frame with the connections of said suspension members to said chassis moving tangentially to circular arcs about said swivel connection, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

10. In an automotive rail vehicle, in combination, a truck frame, a carriage body swivelly mounted on said truck frame, a chassis separate from said body for receiving and supporting a power plant thereon, means separate from said body for supporting said chassis directly upon said truck frame for swinging movement relative thereto upon swiveling movement of said body relative to said truck frame, said separate means including suspension members for one end of said chassis pivotally connected with said truck frame and roller means for supporting the opposite end of said chassis on said truck frame, said suspension members and said roller means cooperating for arcuate displacement of said chassis within said truck frame, a runway on said truck frame for receiving said roller means, flanges on said roller means engaging the sides of said runway for preventing substantial horizontal movement of said chassis longitudinally of said truck frame, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

11. In an automotive rail vehicle, in combination, a truck frame, a carriage body swivelly mounted on said truck frame, a chassis separate from said body for receiving and supporting a power plant thereon, means separate from said body for supporting said chassis directly upon said truck frame for swinging movement relative thereto upon swiveling movement of said body relative to said truck frame, said separate means including suspension members for one end of said chassis pivotally connected with said truck frame and roller means for supporting the opposite end of said chassis on said truck frame, said suspension members and said roller means cooperating for arcuate displacement of said chassis within said truck frame, resilient means for resisting vertical shocks tending to lift said roller means from said truck frame, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

12. In an automotive rail vehicle, in combination, a truck frame, a carriage body swivelly mounted on said truck frame, a chassis separate from said body for receiving and supporting a power plant thereon, means separate from said body for supporting said chassis directly upon said truck frame for swinging movement relative thereto upon swiveling movement of said body relative to said truck frame, said separate means including ball joint pendulum suspension members for one end of said chassis pivotally connected with said truck frame and means for movably supporting the opposite end of said chassis on said truck frame, said suspension members and said movable supporting means cooperating for arcuate displacement of said chassis within said truck frame, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

13. In an automotive rail vehicle, in combination, a carriage body, a truck frame, a chassis separate from said body for receiving and supporting a power plant thereon, a swivel connection for guiding and supporting said carriage body directly on said truck frame for swiveling movement therebetween, means separate from said body and said swivel connection for supporting said chassis within said truck frame for swinging movement relative thereto upon swiveling movement of said body relative to said truck frame, said separate means including a plurality of suspension members movably connecting said chassis with said truck frame for horizontal arcuate displacement of said power plant within said truck frame about said swivel connection, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

14. In an automotive rail vehicle, in combination, a carriage body, a truck frame, a chassis separate from said body for receiving and supporting a power plant thereon, a swivel connection for guiding and supporting said carriage body directly on said truck frame for swiveling movement therebetween, means separate from said body and said swivel connection for supporting said chassis within said truck frame for swinging movement relative thereto upon swiveling movement of said body relative to said truck frame, said separate means including at least three swinging pendulum suspension members movably connecting said chassis with said truck frame for horizontal arcuate displacement of said power plant within said truck frame, and guide means cooperating between said body and said chassis for effecting the swinging of said chassis upon said truck frame to retain said power plant and said chassis in predetermined substantially uniform relation with respect to said body 15. In an automotive rail vehicle, in combination, a carriage body, a truck frame, a chassis separate from said body for receiving and supporting a power plant thereon, a swivel connection for guiding and supporting said carriage body directly on said truck frame for swiveling movement therebetween, means separate from said body and said swivel connection for supporting said chassis within said truck frame for swinging movement relative thereto upon swiveling movement of said body relative to said truck frame, said separate means including at least three swinging pendulum suspension members and ball joints therefor movably connecting said chassis with said truck frame for horizontal arcuate displacement of said power plant within said truck frame, and guide means cooperating between said body and said chassis for effecting the swinging of said chassis upon said truck frame to retain said power plant and said chassis in predetermined substantially uniform relation with respect to said body throughout the swiveling action of said body relative to said truck frame.

16. In an automotive rail vehicle, in combination a carriage body, a truck frame, a chassis separate from said body for receiving and supporting a power plant thereon, a swivel connection for guiding and supporting the carriage body directly on said truck frame for swiveling movement therebetween, said swivel connection lying in a substantially transverse plane which divides said truck frame into forward and rearward sections, means separate from said body and said swivel connection for movably supporting said chassis directly on said truck frame entirely in one of said sections for swinging movement of said chassis relative to said truck frame, and guide means cooperating between said body and said chassis for effecting the swinging of said chassis upon said truck frame to retain said power plant and said chassis in predetermined substantially uniform relation with respect of said body throughout the swiveling action of said action of said body and said truck frame.

17. A replaceable power truck unit for mounting beneath the body of an automotive rail vehicle for swiveling movement thereunder and having suspended in said truck unit a power plant for propelling said vehicle protruding above said unit into said body, comprising a truck frame, a chassis separate from said body and said truck frame for receiving and supporting said power plant thereon, means separate from said body and within said truck frame for supporting said chassis with a substantial portion of said power plant beneath said body and within said truck frame, said supporting means including supporting members providing for swinging movement of said chassis and said power plant relative to said truck frame upon swiveling movement of said body relative to said truck frame, and guide means on said chassis cooperating with said body for effecting said swinging movement to retain said power plant and said chassis in predetermined substantially uniform relation with respect to said body throughout the swiveling operation of said body relative to said truck frame.

18. In an automotive rail vehicle the combination which comprises a carriage body, a truck frame, a swivel connection for mounting said body directly on said frame for swiveling movement with respect thereto, a chassis separate from said body and within said truck frame, said chassis having means for supporting a power plant thereon offset from said swivel connection and with a substantial portion of said power plant below said body and within said frame, means separate from said body and said swivel connection for supporting said chassis on said frame for swinging movement relative thereto upon swiveling movement of said body relative to said frame, and means cooperating between said body and said chassis for effecting said swinging of said chassis relative to said frame upon swiveling of said body relative to said frame.

References Cited in the file of this patent

UNITED STATES PATENTS

| Number | Name | Date |
|---|---|---|
| 1,076,415 | Frost | Oct. 21, 1913 |
| 1,876,312 | Morch | Sept. 6, 1932 |
| 1,980,277 | Koppel et al. | Nov. 13, 1934 |
| 2,056,229 | Blomberg | Oct. 6, 1936 |
| 2,088,484 | Schoepf | July 27, 1937 |
| 2,135,394 | Geissen | Nov. 1, 1938 |
| 2,205,030 | Bugatti | June 18, 1940 |